United States Patent

[11] 3,534,658

| [72] | Inventor | Eugene A. Carsey<br>Cincinnati, Ohio |
|---|---|---|
| [21] | Appl. No. | 803,738 |
| [22] | Filed | March 3, 1969 |
| [45] | Patented | Oct. 20, 1970 |
| [73] | Assignee | The Kirk & Blum Manufacturing Co.<br>Cincinnati, Ohio<br>a corporation of Ohio |

[54] CHIP ENTRAINING AND REMOVAL APPARATUS FOR METAL CUTTING MACHINES
8 Claims, 9 Drawing Figs.

[52] U.S. Cl.................................................. 90/15,
90/11, 15/312, 51/273
[51] Int. Cl....................................................... B23c 1/00,
B24b 55/06

[50] Field of Search........................................... 90/15, 11;
77/55; 51/273; 144/252; 15/312; 241/56

[56] References Cited
UNITED STATES PATENTS
| 2,944,465 | 7/1960 | Jones............................ | 90/11 |
| 3,274,892 | 9/1966 | Carsey.......................... | 51/273X |

Primary Examiner—Gil Weidenfeld
Attorney—Walter S. Murray

ABSTRACT: High pressure apparatus for the entraining, collecting and removal of relatively large metal cuttings, shavings and dust from around the peripheries of moving, rotary cutting tools including novel tool hood and header pipe constructions therefor.

Patented Oct. 20, 1970 3,534,658

INVENTOR
Eugene R. Carsey
BY Jacoby & Murray
ATTY.

INVENTOR
Eugene A. Carsey
BY
ATTY.

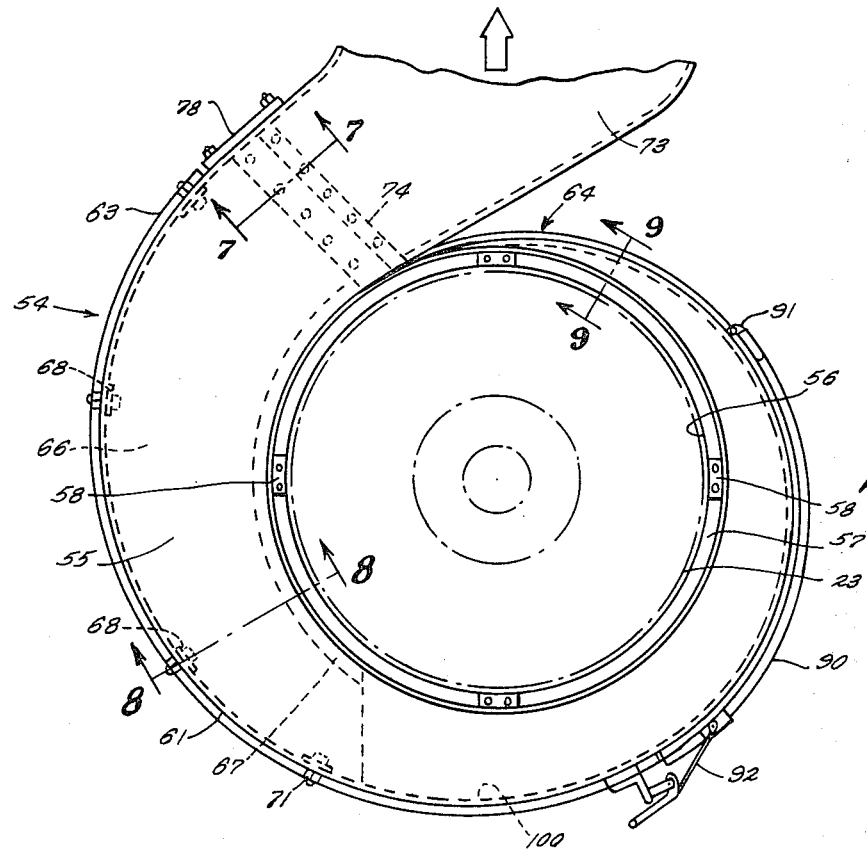

3,534,658

1

CHIP ENTRAINING AND REMOVAL APPARATUS FOR METAL CUTTING MACHINES

This invention relates to chip collectors for metal working machines and is particularly directed to a collector apparatus operated under high pressure and adapted in its several components to entrain and carry off large metal cuttings and shavings as well as small chips and dust particulate created by a moving cutting tool operative upon metal work pieces such as aluminum, or the like.

Heretofore metal chip collection and removal apparatus frequently required an auxiliary chip comminuting mechanism in conjunction with and adjacent the chip entraining hood of the movable cutting tool in order to obtain positive entrainment and movement of the cuttings through the apparatus to a collection station. These chip comminuting mechanisms were generally cumbersome and because of their vibratory nature caused a serious cutting problem in that the vibrations of the comminuting mechanism were difficult to damp out thereby causing vibration of the cutting tools themselves and often creating an unsatisfactory finished surface on the work.

It is therefore the main object of this invention to provide a high pressure operated collector apparatus capable of entraining and removing cuttings, shavings and chips of all sizes from the peripheral areas surrounding the moving tools of metal working machines.

Another object of the invention is to provide a novel tool enclosing hood which forms the chip entraining member for my high pressure collector apparatus which effectively and positively removes metal chips of all sizes centrifugally thrown from the operative peripheral surface of a cutting tool.

A further object of the invention is to provide a slotted header construction capable of operating under the high pressure conditions obtaining in a chip collector having the foregoing characteristics.

Numerous other objects and advantages of the invention will be apparent from the following specification taken in conjunction with the accompanying drawing, wherein like reference numerals indicate identical parts throughout the several views, and wherein:

FIG. 5 is an enlarged, fragmental plan view showing the details of the chip entraining hood for the collector apparatus shown in FIGS. 1—4 of the drawings.

FIG. 6 is a side elevational view of the hood shown in FIG. 5.

FIG. 7 is an enlarged section taken on line 7–7 of FIG. 5.

FIG. 8 is an enlarged section taken on line 8–8 of FIG. 5.

FIG. 9 is an enlarged section taken on line 9–9 of FIG. 5.

Figure 1:
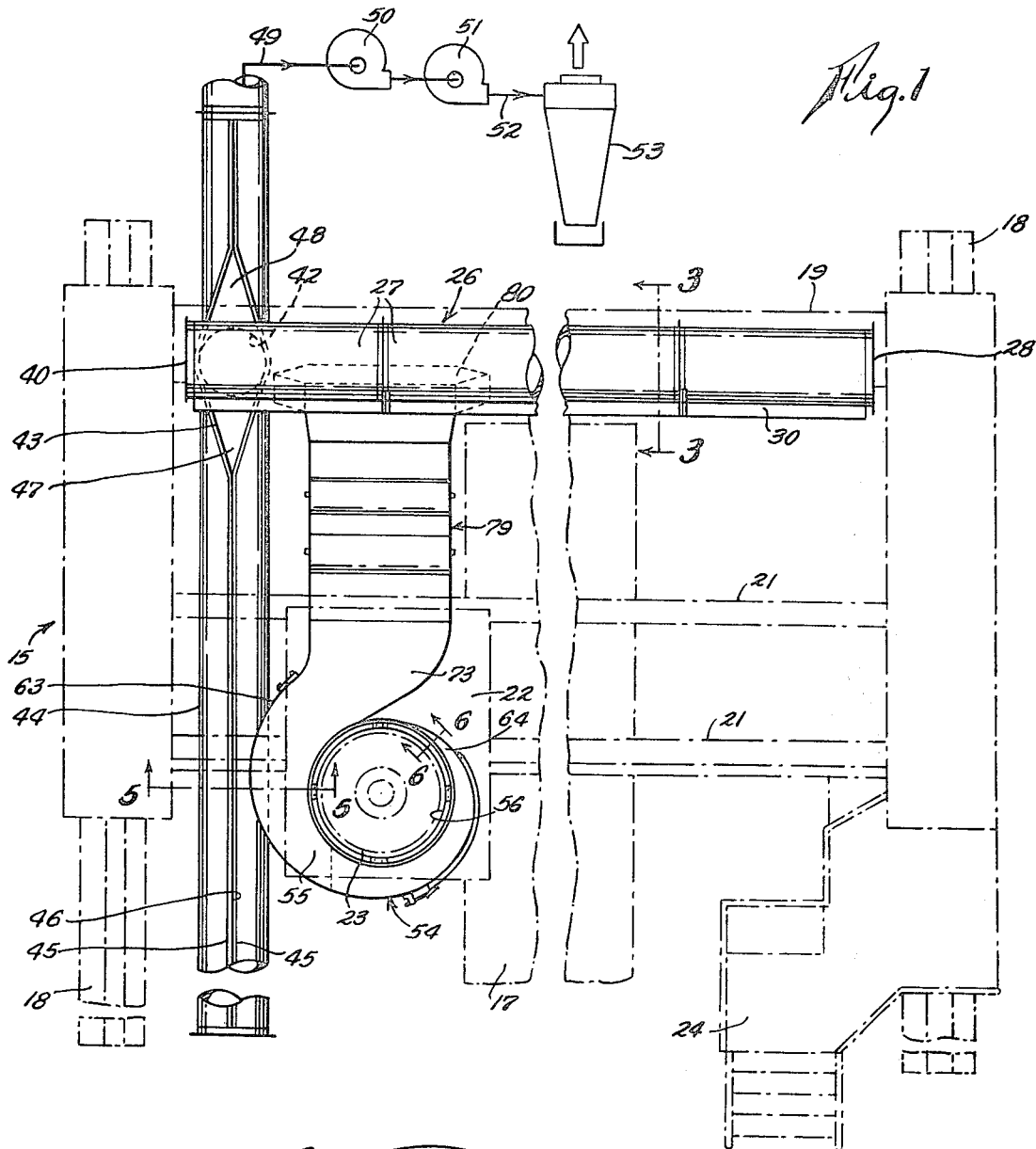
FIG. 1 is a plan view of my chip entraining and removal apparatus, parts thereof being broken away and the outline of a metal working machine being shown therein in dot-and-dash lines.
Figure 2:
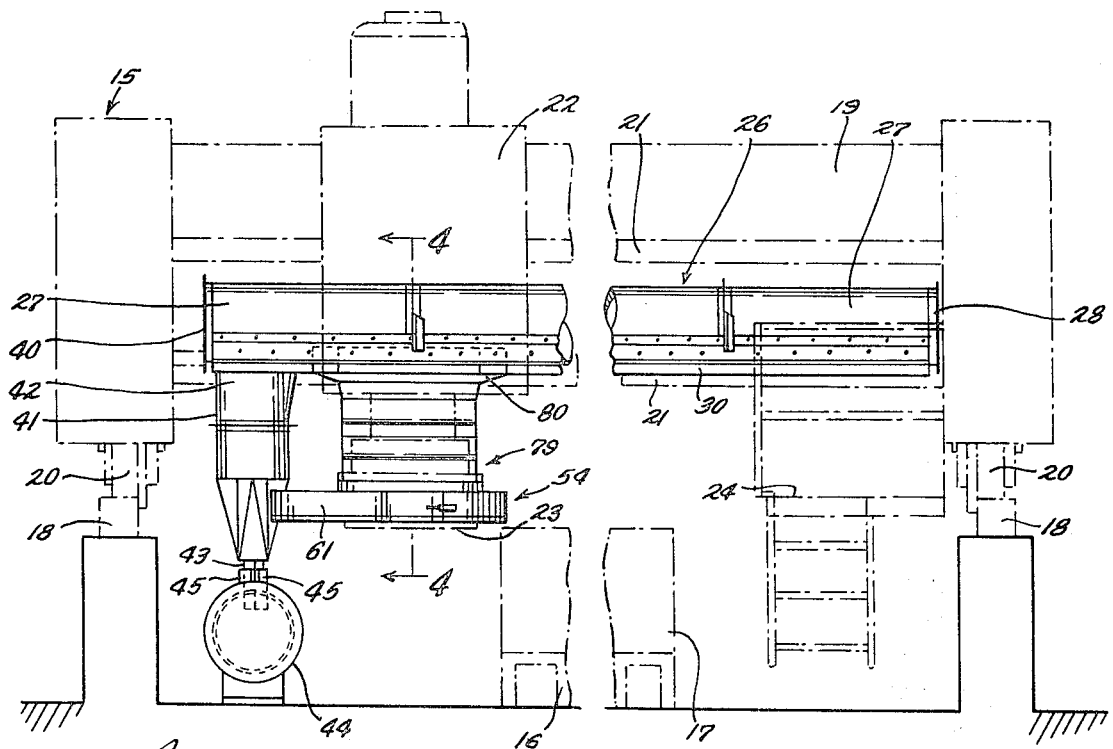
FIG. 2 is an end elevational view of the collector apparatus and metal working machine shown in FIG. 1.
Figure 4:
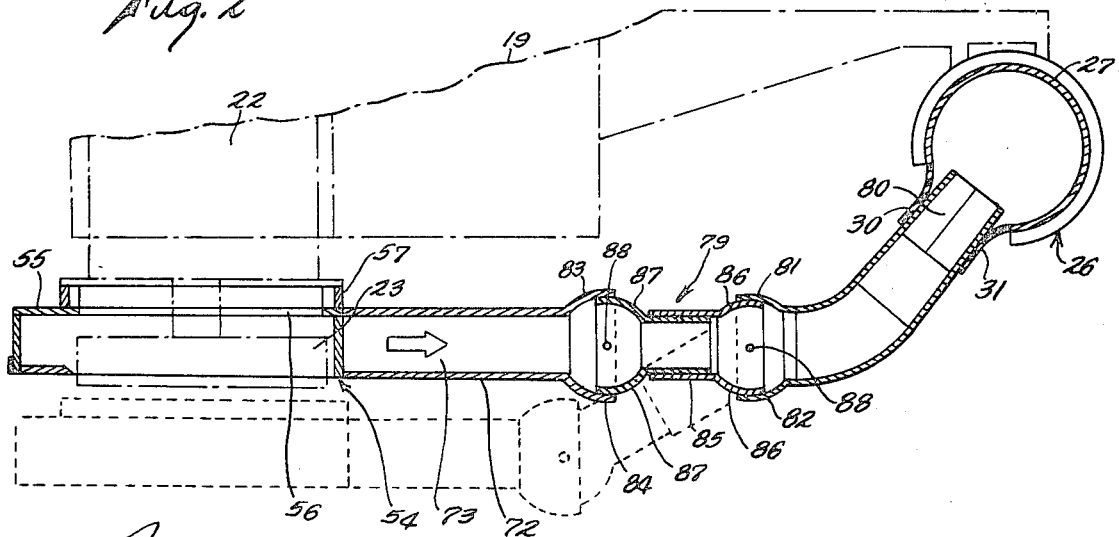
FIG. 4 is an enlarged section taken on line 4–4 of FIG. 2.

The chip entraining and removal apparatus of my invention is illustrated in the drawings as associated with a machine tool for finish cutting a planar major surface on large metal work pieces such as aluminum billets; the metal working machine 15 being shown in dot-and-dash lines in FIGS. 1, 2 and 4. In general, the metal working machine 15 is conventional and has a longitudinally extending work holder 16 that positions a work piece 17 usually in the form of an aluminum billet; or the like, often measuring 120 ft. in length, 20 feet in width and 2 feet in depth. A pair of side rails 18–18 are laterally spaced outwardly from the sides of the work piece 17 and are positioned in the conditioning area parallel to the work holder 16. A carriage 19 has longitudinally spaced apart wheels 20–20 on each side thereof, said wheels being adapted to run on the rails 18–18, whereby the carriage is designed for longitudinal reciprocating movements relative to the work piece. The carriage supports cross slides 21–21 having a tool rest 22 mounted thereon for traversing movements relative to the

2 work piece. A rotary cutting tool 23 is mounted for vertical adjustment on the rest 22; said adjustment being provided to accommodate the machine to varying thicknesses of work and to cutting depths to be made by the tool 23 in the work.

The carriage 19 is propelled longitudinally back and forth along the work piece 17 by a power means (not shown), said tool 23 being intermittently moved laterally on the slide rest 22 to successively cut longitudinal portions from the upper face of the work piece 17 until a flat, planar finished surface is formed thereon. The movements of the carriage and the slide rest are continuously under the control of an operator standing on a carriage mounted platform 24.

My chip collector for metal working machines having the foregoing character and functions comprises a slotted header 26 mounted on the carriage 19 parallel to the cross slides 21–21; the header being in the form of joined pipe sections 27 that are coextensive with the traverse of the tool and preferably closed at one end 28.

Figure 3:
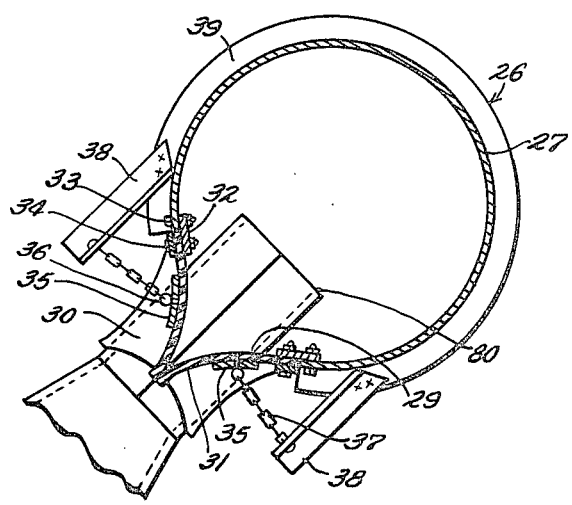
FIG. 3 is an enlarged section taken on line 3–3 of FIG. 1.

As best shown in FIG. 3 of the drawings, the pipe sections 27 of the slotted header 26 each have a lateral opening formed therein, said openings being disposed in alignment to form a continuous slot 29 in and across the header. A pair of flexible strips 30 and 31 are secured to the header 26 on opposite sides of the lateral slot 29 and are adapted to have their free ends in normal face-to-face engagement to normally maintain the slot in air tight, closed condition. Each strip has an edge abutting an edge of the header forming the slot 29 and the means securing each strip to the lateral side of the header may comprise a lateral bar 32 extending across the abutting edge of the header and the strip and fastened by a row of laterally spaced bolts 33 and 34 to the edge portion of the header 26 and the strip, respectively. Because of the high negative pressures obtaining within the header 26 the strips are subjected to relatively great inner stresses and my reenforcing means precluding collapse of the strips consists of a stiff band 35, coextensive with each flexible strip 30 and 31, each band being fastened to its strip by a row of laterally spaced apart eye bolts 36. The means precluding inner collapse of the flexible strips comprises a lateral row of window sash chains 37, each engaged at one end in an eye bolt 36 and anchored at its outer end to an angle iron 38 projecting tangentially from the exterior body portion of the header and fastened thereto preferably by welding the inner end of the angle iron to a fitting 39 joining adjacent header sections 27.

The end portion 40 of the header 26 opposed to its closed end 28 is connected to a short, vertical pipe 41 by a fitting 42; the lower end of the vertical pipe being provided with a plow-shaped nozzle 43 that extends into and has communication with the interior of a slotted exhaust conduit 44 stationerily positioned in spaced parallel relationship inside a rail 18 of the machine tool. The slotted exhaust conduit 44 has substantially the same construction as the slotted header 26 and, as shown in FIGS. 1 and 2, an air tight, sliding connection is secured between the conduit 44 and the nozzle 43 by means of a pair of flexible strips 45–45 secured to the conduit on each side of a longitudinal slot 46 therein and normally adapted to be in face-to-face air-tight engagement with each other. Portions of the strips are spread apart by interposition of the nozzle 43, plow portions 47 and 48 being formed on opposite ends of the nozzle to permit ready opening of the strips as the nozzle passes therebetween and for ready closing of the strips after passage of the plow to maintain an air tight sealed condition for the sliding connection between the conduit and the pipe 41.

With reference to FIG. 1 the exhaust header 44 is connected by a pipe 49 to the intake side of a plurality of series connected blower fans 50 and 51, the discharge side of the series being connected to a pipe 52 which conducts the exhausted air and the entrained cuttings, shavings and dust into a centrifugal collector 53, commonly known in the trade as a "cyclone." The cyclone discharges air vertically into the atmosphere and deposits the entrained matter at the bottom thereof. The exhaust fans serving my apparatus operate at between 50 or 60 inches of water static pressure, and with a novel tool hood 54, now to be described, enables the apparatus to entrain and remove relatively large cuttings, shavings and dust produced by the cutting tool 23 for the machine tool 19.

My hood 54 (FIG. 5) is generally cornucopiate in plan and comprises a top volute shaped wall 55 having a circular opening 56 formed centrally therethrough. A circular, upstanding flange 57 is welded to the top wall 55 around the opening 56, and a number of angularly spaced apart mounting blocks 58 are welded to the top wall between the flange and the opening 56. The mounting blocks have internally threaded bores therein which cooperate with bolts 59 (FIGS. 8 and 9) passed through a horizontal flange 60 on the tool rest to mount the hood thereon. A skirt 61 is welded to and depends from the outer marginal edge of the top wall 55 and has a bottom edge 62 disposed closely adjacent the upper surface of the work 17.

With particular reference to FIGS. 5—9 of the drawings, the top wall 55, the skirt 61 and the periphery of the tool 23 form a cornucopiate air flow channel 100 for entraining cuttings and chips thrown centrifugally from the periphery of the rotary cutting tool 23; the discharge outer end 63 of the hood having the largest cross-sectional area while the opposed tapered end 64 of the hood is located next adjacent the outlet end 63 with respect to the clockwise rotatory movement of the tool (FIG. 5). The bottom of the skirt is reenforced against internal impact with large cuttings or damaged tool pieces by a heavy metal guard ring 65 secured to the bottom exterior portion of the skirt. A horizontal baffle plate 66, substantially crescent-shaped in plan, is positioned on the skirt at the large discharge end portion of the hood; said plate projecting inwardly from the skirt to a position adjacent the periphery of the tool. This baffle plate restricts the air intake for the hood at that portion to thereby increase the effective entraining airstream of the hood around the tool periphery at the small end of the air flow channel 100. The baffle plate has a bevelled inner edge 67 adjacent the periphery of the tool to deflect cuttings upwardly into the channel 100.

With reference to FIG. 8 it will be understood that the baffle plate is mounted on the skirt for vertical adjustable movement by a series of upstanding ears 68 welded to the outer periphery of the plate, said ears having bolts 69 welded thereto which project through vertical slots 70 in the skirt; the free ends of the bolts engaging nuts 71 which may be externally rotated to hold the skirt in adjusted vertical positions.

With reference to FIGS. 5 and 7 it will be seen that the down stream edge of the baffle plate 66 is connected to a bottom wall 72 of an exit conduit 73 by means of a flexible diaphragm 74, said diaphragm being secured to the baffle plate and the bottom wall 72 by a series of bolts 75 and 76, respectively, a guard plate 77 being fixed upon and over the diaphragm to protect the latter from abrading impact with the cuttings and shavings carried by the air stream. A removable door 78 closes a service opening in the skirt adjacent the diaphragm for repair and replacement purposes.

The hood 54 is connected to the header 26 by a jointed and extensible conduit 79 (FIGS. 2 and 4) that is substantially rectangular in section to provide vertical movement of the hood with the tool when the tool requires vertical adjustment. The upper end of the conduit 79 is connected to a plow shaped nozzle 80 that extends into the header through the slot 29 and is laterally slidable between the flexible strips 30 and 31 of the header. As best shown in FIG. 4 the end of the nozzle 80 terminates in rounded top and bottom flanges 81 and 82, while the exit conduit 73 from the hood has rounded top and bottom flanges 83 and 84. An intermediate telescoping conduit section 85 is provided with opposed rounded end flanges 86—86 and 87—87 which are rotatably received in the rounded ends 81—82 and 83—84, respectively. Horizontal pivots 88 are provided at the joints to permit relative pivotal movement of the telescoping intermediate section 79 with respect to the exit conduit 73 and the nozzle 80. A side of the hood may have a service opening 89 therein which is closed by a door 90 hinged at 91 to the skirt 61 and held in closed position at its free end by a suitable latch 92.

In operation of the device a work piece 17 is mounted in the usual manner upon the bed 16; as by suction devices (not shown) and the rotary cutting tool 23 is adjusted vertically into proper working position to take off the required amount of material from the upper major face of the work piece whereafter the fans 50 and 51 are actuated. The operator standing on the platform 24 will then control and move the tool laterally into working position to take the first longitudinal cut from the surface of the work, the carriage being operated longitudinally to carry the tool along the work. As each longitudinal cut is made the operator moves the tool laterally to the next position for taking the next longitudinal cut in the work, and such process continues until the entire surface of the work has been finished. During the operation, large cuttings, pieces of shavings and dust are severed from the work by the cutting tool 23 and all such pieces are entrained in the hood 54 by my high pressure collector system and continuously carried through the jointed and extensible conduit 79 into the header 26 by the sliding connection between the nozzle 80 and the slot 29. The entrained material is then carried down the pipe 41 and continuously into the exhaust conduit 44 by reason of the sliding connection between the nozzle 43 and the slot 46 and thence through the fans 50 and 51 to the cyclone 53 where they are collected in the bottom thereof.

I claim:

1. In apparatus for entraining and removing chips from around the rotary tool of a metal cutting machine having a cross slide and a traversing tool rest on the cross slide, a hood having a top wall and a downturned skirt depending from the top wall, means mounting the hood on the tool rest, said hood closely enclosing the tool and in axial alignment therewith, a header having a lateral slot therein mounted on the cross slide, a pair of strips normally closing the slot, a plow-shaped nozzle extending into the header between the strips, a conduit connecting the interior of the hood to the nozzle and adapted to propel the nozzle through the header in unison with the movement of the tool, a high pressure exhaust means, and conduit means connecting the header with the high pressure exhaust means.

2. The apparatus set forth in claim 1 wherein the hood has a volute configuration in plan.

3. The apparatus set forth in claim 1 wherein the strips of the slotted header are flexible and are normally held by the pressure within the header in face-to-face contact, and a reenforcing band mounted on the outside of each flap and located intermediate the sides thereof.

4. The apparatus set forth in claim 3 wherein a flexible restraining means is anchored to the header and has its opposed end connected to the band, said means precluding inward collapse of each strip.

5. The apparatus set forth in claim 1 wherein the traversing tool rest is provided with vertical adjustable movement on the tool slide and wherein the conduit is jointed and extensible to permit vertical adjustment of the hood in conjunction with said vertical movement of the tool rest.

6. The apparatus set forth in claim 5 wherein the conduit has a spaced pair of joints each rotatable about a horizontal axis, and an extensible telescoping connection located in the conduit between the said joints.

7. The apparatus set forth in claim 1 wherein the high pressure exhaust means is a plurality of series connected fans.

8. The apparatus set forth in claim 7 wherein the conduit means comprises a longitudinally positioned slotted exhaust pipe and a sliding connection between the exhaust pipe and the slotted header.